Feb. 20, 1923. 1,446,060.
C. R. PRATT.
CHUCK.
FILED AUG. 9, 1919.
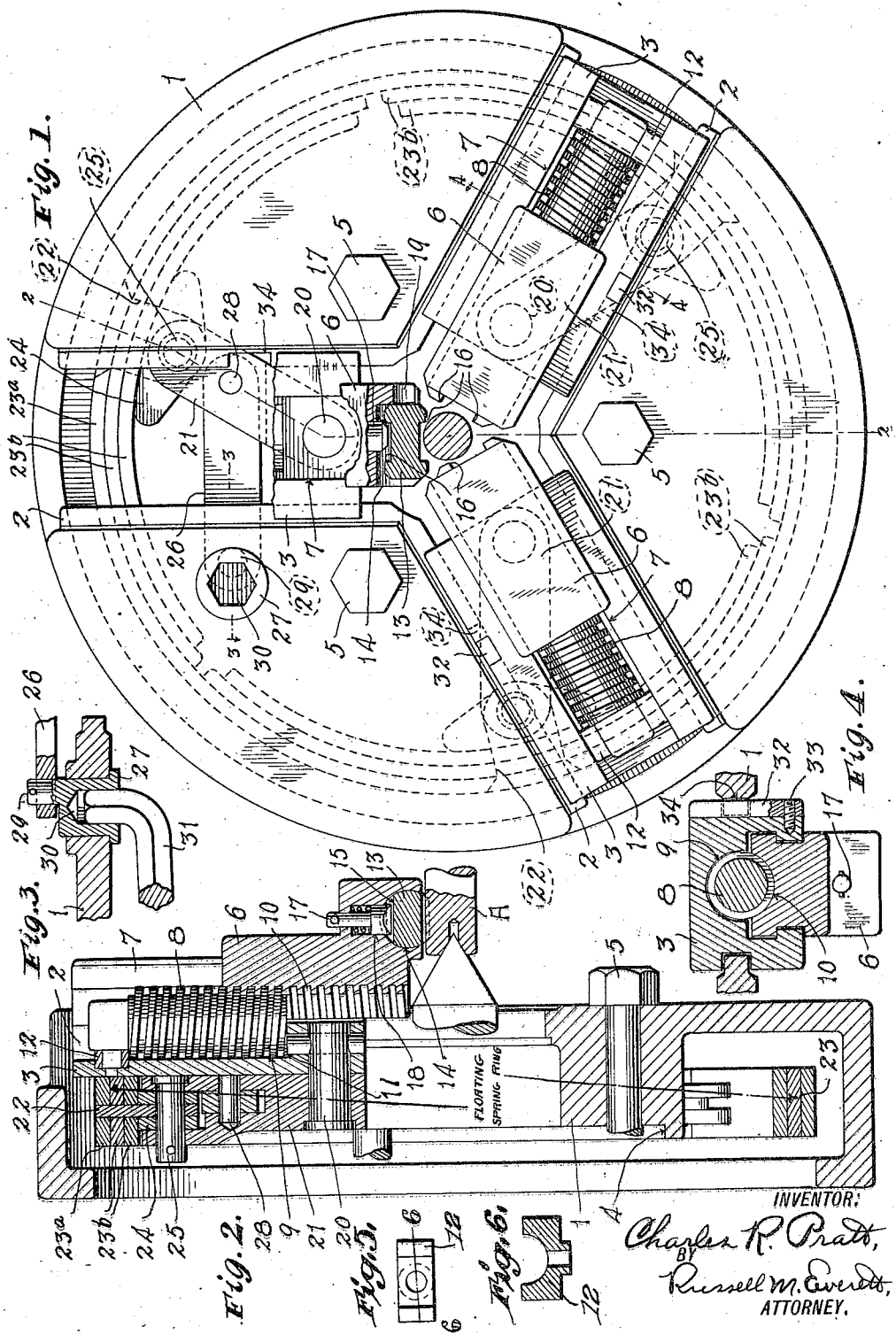
INVENTOR:
Charles R. Pratt,
BY
Russell M. Everett,
ATTORNEY.

Patented Feb. 20, 1923.

1,446,060

UNITED STATES PATENT OFFICE.

CHARLES R. PRATT, OF MONTCLAIR, NEW JERSEY, ASSIGNOR TO THE E. HORTON & SON COMPANY, OF WINDSOR LOCKS, CONNECTICUT, A CORPORATION OF CONNECTICUT.

CHUCK.

Application filed August 9, 1919. Serial No. 316,319.

*To all whom it may concern:*

Be it known that I, CHARLES R. PRATT, a citizen of the United States, and a resident of Montclair, in the county of Essex and State of New Jersey, have invented new and useful Improvements in Chucks, of which the following is a specification.

The objects of this invention are to secure an improved chuck for rotating work held on centers in a lathe or the like; to provide an arrangement of floating jaws whereby the jaws will adapt themselves to grip eccentric work surfaces with an even pressure on each jaw irrespective of the amount of eccentricity; to provide means for positively holding the work in its centered position, thus removing all jaw and tool pressure from the lathe centers; to secure improved means whereby work of slightly varying diameters may be gripped in the jaws of the chuck without change in the radial adjustment of the jaws relative to the center, and with substantially uniform jaw pressure; to secure high efficiency and great simplicity and durability; to utilize for these purposes toggles for operating the jaws and a floating spring ring for simultaneously operating the toggles; to arrange such toggles so that they assume substantially radial positions when the jaws grip the work so as to lock the same; to adapt the invention to quick insertion and removal of the work, and to obtain other objects and results as may be brought out in the following description.

Referring to the accompanying drawing in which like numerals of reference indicate the same parts throughout the several views, Figure 1 is a face view of a chuck constructed in accordance with my invention, portions being broken away to more clearly illustrate the details of construction;

Figure 2 is a transverse sectional view on the line 2—2 of Fig. 1;

Figure 3 is a horizontal sectional view on the line 3—3 of Fig. 1;

Figure 4 is a similar view on the line 4—4 of Fig. 1;

Figure 5 is an end elevation of the preferred form of half collar, more fully hereinafter described; and Figure 6 is a section on the line 6—6 of Figure 5.

Specifically describing the preferred embodiment of the invention illustrated the numeral 1 designates the body portion of the chuck having in its face radial guideways 2 which receive floating jaw slides 3, which extend substantially the full length of the guideways 2, thus providing a large bearing surface and great strength, the back of the chuck body being provided with an annular recess 4 to receive an adapter (not shown) which is secured to the chuck by means of bolts 5. The jaw slides 3 each receive an adjustable jaw 6 slidable in guideways 7 formed in the faces of the jaw slides 3, said jaws being adjustable relatively to the slides 3 by means of screws 8 mounted in longitudinal semi-circular grooves 9 in the slides 3, and engaging threaded grooves 10 in the backs of the jaws 6. The screws 8 are held against longitudinal movement by abutments 11 at the bottoms of the grooves 9 and half collars 12 secured to the slides 3, which engage the tops of the screws 8.

Each jaw 6 is provided with a removable bit 13, each of said bits being generally cylindrical in cross-section and fitted within corresponding cylindrical openings 14 transversely of the jaw. Each of said bits 13 is formed on opposite sides thereof with milled or cut away portions 15 which form four biting edges 16 only one of which is adapted to grip the work at a time. As one edge 16 becomes dull another may be substituted by merely changing the position of the bit in the jaw 6, and if desired the bits 13 can be replaced by soft metal jaws for finished work. The bits 13 are shown as held in position by means of spring pressed pawls 17 slidably mounted in longitudinal openings 18 in the jaws 6, the lower ends of the pawls being beveled at substantially 45° and engaging one of the edges 16 of the bits 13 to hold the bits in position in the openings 14. A hole 19 is formed at the inner end of each of the openings 14 to allow insertion of a rod or pin to remove the bit from the opening 14. The working edges 16 of the bits 13 are back of the work center and thus hold the work with less jaw pressure and no greater incision into the work than any other form of hard jaw tooth or dog set screw. By rotation in the openings 14 the bits 13 can automatically adapt themselves to angular work surfaces, such as tapered shafts.

The jaws 6 are adjustable relatively to the slides 3 to accommodate large variations in the diameter of the work inserted in the chuck, and the slides 3 are in turn movable in the guideways 2 to quickly grip and release the work after the rough adjustment of the jaws 6 by the screws 8. For these purposes each slide 3 is shown as connected by means of a pivot pin 20 to one end of a toggle 21 arranged at the back of the chuck, each of said toggles having its opposite end bifurcated to receive a flat key 22 which passes through and is rigidly attached to a floating spring ring 23. This spring ring consists of an outer continuous metallic ring 23ª which may or may not be tempered, and opposite each of the toggles is provided with a plurality of tempered steel leaves 23ᵇ. A bearing plate 24 is arranged on each side of the key 22 on the inside of the ring 23, and a pin 25 passes through the toggle, bearing plates 24 and key 22 so as to secure the toggle 21 to the spring ring. The key 22, bearing plates 24 and pin 25 also serve to clamp the leaves to the continuous ring 23ª, and in the clamping action the ring is put under an initial tension of 75% of its full load. With this construction it will be obvious that rotation of the spring ring will cause the toggles to move the slides 3 in the guideways 2, and that the slides will be moved simultaneously and the same distance. The spring ring 23 has no connection with or bearing on the chuck except through the toggles 21, and is free to rotate and also to move bodily in its own plane and relatively to the chuck body either in straight diametric directions or eccentrically.

For the purpose of rotating the ring 23 one toggle 21 is connected by means of a link 26 to a rotating plug 27 mounted in the body of the chuck. One end of the link 26 is pivotally connected by a pin 28 to the toggle, while the opposite end thereof is connected to a pivot stud 29 eccentrically disposed on and projecting longitudinally from the inner end of the plug 27. The plug 27 is formed with a hexagonal socket 30 adapted to receive a wrench or key 31 as shown by Figure 3, and it will be obvious that rotation of the plug 27 by the wrench 31 will cause the floating ring 23 to rotate and at the same time move all of the toggles so as to actuate the chuck jaws. The outward movement of the jaw slides 3 is limited by a stop key 32 secured to the one side of each slide 3 by any suitable means, such as the headless screw 33, said keys sliding in slots or notches 34, in the guideways 2. These keys and slots not only limit the outward movement of the jaws but automatically determine the position of the floating element and approximately center the jaws when the ring is given its full movement to open the jaws, thereby bringing every key 22 up against the ends of the slots 24, at which position the jaws are preferably originally adjusted by screws 8.

This construction is designed primarily for use with work held on centers and which requires accurate centering, the chuck serving to rotate the work, and at the same time securely gripping the work to remove all jaw and tool pressure from the lathe centers.

In the operation of the chuck, assuming it is desirable to secure an eccentric shaft A, held on centers, as shown in Figures 1 and 2, in the chuck, the jaws 6 are first adjusted by the screws 8 to loosely receive the stop shaft, and are centered by bringing the stop keys 32 against the outer end of the slots 34, after which the wrench 31 is inserted in the hexagonal socket 30 of the plug 27 and the plug given substantially a half turn to the left. This causes all the toggles to assume a substantially radial position, and moves all the jaws simultaneously toward the shaft A. The jaw nearest the work or shaft A will engage the shaft first, with substantially no pressure, after which the floating ring 23 will shift bodily in its own plane parallel to the plane of the chuck and also rotate, whereupon the next nearest jaw will engage the work, and finally after further shifting of the ring 23 the last jaw will engage the work. The pins 20 connecting the toggles 21 to the jaws now become fixed centers for the toggles, and the length of the toggles being greater than the radial distance between the pins 20 and the floating spring ring 23, further movement of the toggles toward a radial position will cause the spring ring to expand and consequently cause all the jaws to exert pressure on the work. The leaves 23ᵇ of the spring ring are tempered and are held by the keys 22 under an initial tension of 75% of their full load, and as the movement of the toggles is slight the resistance of the spring ring 23 to the outward thrust of the toggles varies little throughout the entire jaw motion, so that the pressure upon all of the jaws is substantially uniform. Furthermore, the jaws are initially centered by the stop keys 32, and float freely upon the chuck until all the jaws grip the work, when they grip the work with uniform pressure, thus removing all jaw pressure from the lathe centers. As has been above stated, after the jaws have gripped the work the pivot pins 20 become fixed centers for the toggles, and thus the jaws securely hold the work, thereby also removing all tool pressure from the lathe centers. The toggles 21 being in substantially radial positions when the work is gripped in the jaws, the jaws are locked against outward movement and tend to remain locked under their maximum pressure until the plug 27 is again rotated to throw the toggles out of their radial positions. It will be noted that the screw adjustment of the jaws 6 on the slides 3 provides for maximum variation in diameters of work, and the toggle motion and floating ring 23 provide for quick gripping and removal of the work, and also accommodate small variations in diameter of work, and eccentric work surfaces.

Obviously many detail modifications and changes may be made in manufacturing my improved chuck without departing from the spirit and scope of the invention, and I do not wish to be understood as limiting myself except as required by the following claims when construed in the light of the prior art.

Having thus described the invention, what I claim is.

1. A chuck including a body portion, movable jaws mounted thereon, a floating distortable, resilient, yielding ring, and means connecting said floating ring and jaws for simultaneously actuating said jaws.

2. A check for use in turning work on centers including a body portion, movable jaws mounted thereon, resilient means adapted, prior to closure of the jaws on the work, to move bodily and freely in a plane parallel to the plane of the chuck body, and means connecting said jaws and said resilient means for actuating the jaws.

3. A chuck including a body portion, movable jaws mounted thereon, toggles for actuating said jaws, and a member connected to said toggles, said member shiftable transversely of the body portion and rotatable for simultaneously applying spring pressure to said jaws.

4. A chuck including a body portion, movable jaws mounted thereon, toggles for actuating said jaws, means connected to each of said toggles and shiftable transversely of said body portion of the chuck, said means supplying spring pressure individually to each jaw.

5. A chuck including a body portion, movable jaws mounted thereon, a member rotatable and bodily movable independent of said body portion of the chuck, a toggle connected to each of said jaws and to the said independent member, and means for actuating said toggles.

6. A chuck including a body portion, movable jaws mounted thereon, a floating, distortable ring independent of the said body portion of the chuck, a toggle between each of said jaws and to the floating ring, and means for actuating the toggles.

7. A chuck including a body portion, movable jaws mounted thereon, a floating spring ring independent of the said body portion of the chuck, a toggle connected to each of said jaws and to said floating spring ring, and means for actuating said toggles.

8. A chuck including a body portion, movable jaws mounted thereon, a rotatable member freely shiftable transversely of the said body portion of the chuck, and means for translating rotary movement of said member into rectilinear movement of said jaws.

9. In a chuck, the combination with a body portion and jaws carried in guided relation thereto, of toggles for moving said jaws, and a floating resilient ring on said body portion for operating said toggles.

10. In a chuck, the combination with a body portion and jaws radially movable thereon, of toggles for moving said jaws, and rotary means for simultaneously applying direct spring pressure to said toggles.

11. A chuck including a body portion, movable jaws mounted thereon, and floating means for actuating said jaws by spring pressure, whereby to bring the jaws successively into engagement with the work and exert a uniform pressure thereon.

12. A chuck including a body portion, movable jaws mounted thereon, and a floating spring ring for applying pressure to said jaws, whereby work eccentric to the lathe centers may be gripped with a uniform pressure.

13. A chuck comprising, in combination, a body portion, jaws carried in guided relation to said body portion, and floating lever means for pressing said jaws against the work, whereby work surfaces of varying diameters or eccentric to the lathe centers may be gripped with uniform jaw pressure.

14. A chuck including a body portion, movable jaws mounted thereon, a floating spring ring normally under tension, and actuating means for said jaws connected to said spring ring.

15. A chuck including a body portion, movable jaws mounted thereon, a resilient ring normally under tension, thrust members between said resilient ring and movable jaws, and means for actuating said thrust members.

16. A chuck including a body portion, movable jaws mounted thereon, a floating spring ring normally under tension, and thrust members between said jaws and spring ring, said thrust members shaped and proportioned to distort the ring when the jaws are gripping the work.

17. A chuck including a body portion, movable jaws mounted thereon, toggles for operating said jaws, and yielding means cooperating with said toggles to permit their being brought to a substantially full radial locking position, notwithstanding variations, within limits, of the diameter of the work gripped by the jaws.

18. A chuck for holding work on lathe centers comprising, in combination, a body portion, floating jaws, a floating resilient ring, and means between said ring and jaws for simultaneously actuating said jaws.

19. A chuck for holding work on lathe centers comprising, in combination, a body portion, floating jaws, a floating resilient ring, and means between said ring and jaws for simultaneously actuating said jaws with attendant distortion of said ring.

20. A chuck for holding work on lathe centers comprising, in combination, a body portion, floating jaws, a floating resilient ring, and means between said ring and jaws for simultaneously actuating said jaws with attendant distortion of said ring, the pressure on said jaws being equalized by said ring and determined by the degree of distortion of said ring.

21. A chuck comprising, in combination, a body portion, a jaw, a spring on the leaf type, a thrust member between said spring and jaw, and means for changing the angle of said thrust member relative to the jaw, said spring yielding when a predetermined pressure of the jaw on the work has been reached.

22. A chuck comprising, in combination, a body having a guideway therein, a main jaw slidable in said guideway, spring means pressing said jaw toward the work, and a work-gripping bit carried by said jaw and engaging the work at a point out of the line of radial movement of the jaw in a direction rearwardly thereof considered with reference to the direction of rotation of the chuck, whereby minimum radial pressure will produce maximum torsional gripping of the work.

23. A chuck including a body portion, movable jaws, a floating ring and means connecting said floating ring and jaws for simultaneous yielding movement in the work-engaging direction.

24. A chuck comprising, in combination, a body portion, jaws, floating means and means for transmitting jaw-closing force initially to a part directly carried by said body, thence to said floating means and thence to said jaws.

25. A chuck comprising, in combination, a body portion, jaws, floating means and means for transmitting jaw-closing force initially to eccentric means directly carried by said body, thence to said floating means and thence to said jaws.

26. A chuck comprising, in combination, a body portion, floating spring means, and thrust means between said floating spring means and the work.

27. A chuck for holding work on lathe centers comprising, in combination, a plurality of floating jaws, spring means and means for loading said spring means to apply pressure to the jaws and for unloading said spring means to remove pressure from the jaws.

28. A chuck for holding work on lathe centers comprising, in combination, a plurality of floating jaws, spring means and means for loading said spring means to apply pressure to the jaws and for unloading said spring means to remove pressure from the jaws, said spring means at all times under initial stress in the direction in which said spring is loaded to apply pressure to the jaws.

29. A chuck comprising, in combination, a body, jaws, floating means including thrust elements pivoted to the jaws, means for swinging said thrust elements to move said jaws toward the work, the pivots between the thrust elements and jaws becoming fixed axially when the jaws engage the work, and means permitting further swinging of said thrust elements about said pivots after the same become fixed axially.

30. A chuck for turning work on centers comprising, in combination, a plurality of floating slides, adjustable jaws carried by said slides, limiting means for determining the extent of movement of said slides in a direction away from the axis of the chuck, said limiting means, when the slides are fully opened to receive the work, determining the relative position of said floating slides to each other and to the lathe center.

31. A chuck for turning work on lathe centers comprising, in combination, a plurality of floating slides, and limiting means for determining the extent of movement of said slides in a direction away from the axis of the chuck, said limiting means tending to center said slides when fully open to receive the work.

32. A chuck for turning work on lathe centers comprising, in combination, a plurality of floating slides, work-gripping jaws adjustably attached to said slides, and limiting means for determining the extent of movement of said slides in a direction away from the axis of the chuck, said limiting means tending to center said slides when fully open to receive the work and thereby tending to centre the work-gripping jaws.

33. In a chuck, in combination with a body portion providing an axial bore for receiving a lathe centre, said body portion non-shifting relative to said lathe centre, jaws slidable in defined paths toward and from the axis of the chuck body, and jaw-operating means shiftable bodily relative to the chuck body in a direction transverse to the axis of the chuck body, said jaw-operating means operable coordinately to actuate a plurality of said jaws thereby to permit the location of the axis of the work to be determined by the lathe centre and whereby, when gripping the work the positions of the jaws relative to one another and relative to the chuck body may be coordinately determined by the position and shape of the work.

34. In a chuck, in combination with a body portion providing an axial bore for receiving a lathe centre, said body portion non-shifting relative to said lathe centre, jaws slidable in defined paths toward and from the axis of the chuck body, and jaw-operating means carrying angularly shiftable thrust elements coordinately to actuate a plurality of said jaws, said jaw-operating means shiftable bodily relative to the chuck body in a direction transverse to the axis of the chuck body, thereby to permit the location of the axis of the work to be determined by the lathe centre and whereby, when gripping the work the positions of the jaws relative to one another and relative to the chuck body may be determined by the position and shape of the work.

35. In a chuck, the combination of a body fixed relative to the lathe spindle, a plurality of jaws radially guided in said body, means for coordinately moving said jaws radially to grip and release the work, said means for moving said jaws mounted for free movement radially to insure engagement of the work by all of said jaws prior to final gripping of the work by the jaws.

36. In a chuck, the combination of a body portion, a floating portion driven by said body portion, work-gripping means, means on said body portion for determining the directions of work-gripping and releasing movement of said work-gripping means and means between said floating portion and said work-gripping means for transmitting opening and closing force from said floating portion to said work-gripping means.

37. In a chuck, the combination of a body portion, jaws, toggles for moving said jaws, floating rotatable means for operating said toggles but rectilinearly shiftable in a plane perpendicular to said axis, and means for turning said rotatable means relative to the chuck body.

38. In a chuck, the combination of a body portion, a floating portion driven by said body portion, work-gripping means, means on said body portion for determining the directions of work-gripping and releasing movement of said work-gripping means and means between said floating portion and said work-gripping means for transmitting opening and closing force from said floating portion to said work-gripping means, said means on said body portion for determining the directions of work-gripping and releasing movement relieving said floating portion of torsion and lateral strains arising from operation of the machine carrying the chuck.

39. A chuck comprising, in combination, a chuck body having provision for receiving axially a lathe centre, said chuck body non-shiftable relative to said lathe centre, a plurality of jaws, means for coordinately moving said jaws toward the work, said means permitting work to be centered by said lathe centre and the gripping position of said jaws to be determined by the points of engagement between the jaws and the work.

40. A chuck comprising, in combination, a body, jaws, floating means to operate said jaws and cooperating means on the chuck body and on said floating means tending to locate said floating means in defined position when said jaws are fully open to receive the work.

41. A chuck comprising, in combination, a floating portion, jaws, and means acting through the floating portion for moving the jaws into work-engaging position, whereby when gripping the work the position of said jaws relative to one another and relative to the chuck body may be determined by the position and shape of the work.

42. A chuck for turning work on a lathe centre comprising, in combination, a plurality of work-gripping jaws, a body portion having slideways for guiding the movement of said jaws, floating means for moving said jaws in said slideways, said floating means permitting the position of said jaws in said slideways to be determined by the position of the work, said jaws and slideways organized with the cooperating parts to bind against one another, after the jaws grip the work, whereby strains tending to move the work relative to the body are taken primarily by the body and not by the lathe centre.

43. In a chuck, the combination with a body portion and adjustable jaws thereon, of toggles for moving said jaws, and a floating ring on said body portion for operating said toggles.

44. In a chuck, the combination with a body portion and adjustable jaws thereon, of toggles for moving said jaws, and a floating ring capable of shifting with respect to the body portion for operating said toggles.

45. In a chuck, the combination with a body portion and jaws radially movable thereon, of toggles for moving said jaws, and floating means for coordinately operating said toggles, said means arranged and adapted to shift transversely of the chuck.

46. In a chuck, the combination with a body portion and adjustable jaws thereon, of toggles for moving said jaws, and a floating ring on said body portion for operating said toggles.

47. In a chuck, the combination with a body portion and adjustable jaws thereon, of toggles for moving said jaws, a floating ring on said body portion for operating said toggles, and means for turning said floating ring with respect to the chuck body.

CHARLES R. PRATT.